United States Patent
Pasca

(10) Patent No.: US 9,904,512 B1
(45) Date of Patent: Feb. 27, 2018

(54) METHODS AND APPARATUS FOR PERFORMING FLOATING POINT OPERATIONS

(71) Applicant: Altera Corporation, San Jose, CA (US)

(72) Inventor: Bogdan Pasca, Chesham (GB)

(73) Assignee: Altera Corporation, San Jose, CA (US)

( * ) Notice: Subject to any disclaimer, the term of this patent is extended or adjusted under 35 U.S.C. 154(b) by 771 days.

(21) Appl. No.: 13/907,134

(22) Filed: May 31, 2013

(51) Int. Cl.
*G06F 7/48* (2006.01)
*G06F 7/483* (2006.01)

(52) U.S. Cl.
CPC ................................ *G06F 7/483* (2013.01)

(58) Field of Classification Search
CPC ........................................... G06F 2207/5355
See application file for complete search history.

(56) References Cited

U.S. PATENT DOCUMENTS

| | | | | |
|---|---|---|---|---|
| 5,341,321 A | * | 8/1994 | Karp | G06F 7/5525 708/500 |
| 7,191,204 B1 | * | 3/2007 | Ogata | G06F 7/535 708/605 |
| 2006/0190516 A1 | * | 8/2006 | Simkins | G06F 7/02 708/490 |
| 2010/0318592 A1 | | 12/2010 | Han et al. | |
| 2012/0059866 A1 | | 3/2012 | Brady et al. | |

FOREIGN PATENT DOCUMENTS

WO 2010144673 3/2011

OTHER PUBLICATIONS

Wikipedia, Arithmetic Shift, Oct. 30, 2011, pp. 1-3.*

* cited by examiner

*Primary Examiner* — Michael D Yaary
(74) *Attorney, Agent, or Firm* — Treyz Law Group, P.C.; Jason Tsai; Vineet Dixit

(57) ABSTRACT

A floating-point arithmetic block for performing arithmetic operations on floating-point numbers on an integrated circuit includes a unit to handle exceptions, a unit to handle the exponent, a unit for normalization and rounding, and a core having a multiplier, a subtractor, storage circuitry to store multiple initial mantissa values, and configurable interconnect circuitry. The configurable interconnect circuitry may be configured to route signals throughout the floating-point arithmetic block. The configuration may be performed by a finite state machine that controls the configurable interconnect depending on the selected floating-point arithmetic operation. The floating-point arithmetic block may be configured to implement a variety of floating-point arithmetic operations including the inverse square root operation, the square root operation, the inverse operation, the division, the multiplication, the addition, and the subtraction.

17 Claims, 12 Drawing Sheets

METHODS AND APPARATUS FOR PERFORMING FLOATING POINT OPERATIONS

BACKGROUND

This invention relates to integrated circuits and, more particularly, to performing floating-point operations using an integrated circuit.

Floating-point numbers are commonplace for representing real numbers in scientific notation in integrated circuits thanks to a desirable balance between numeric range and precision. Floating-point numbers are typically represented in binary format in accordance with the IEEE754 standard, which defines a floating-point number as consisting of a sign, a mantissa, and an exponent.

The arithmetic operations frequently performed on floating-point numbers are addition, subtraction, and multiplication. Operations such as division and square root are performed less frequently because division and square root are among the most complex arithmetic operations that generally use the most device resources. Therefore, efficient support for division and square root operations and similarly resource intensive floating-point operations such as the inverse square root and the inverse operation may be desirable.

SUMMARY

In accordance with embodiments of the present invention, circuitry for performing arithmetic operations on floating-point numbers may include a multiplier circuit, a subtractor circuit coupled to the multiplier circuit, a storage circuit, and configurable interconnect circuitry. The storage circuit may be coupled to the multiplier circuit and the subtractor circuit, and may store a plurality of initial mantissa values. The configurable interconnect circuitry may route signals in and out of the multiplier circuit, the subtractor circuit, and the storage circuit. Thereby, the configurable interconnect circuitry may be configured to implement a plurality of arithmetic operations. For instance, the configurable interconnect circuitry may be configured to implement arithmetic operations such as inverse square root, square root, inverse, division, multiplication, addition, and subtraction.

It is appreciated that the present invention can be implemented in numerous ways, such as a process, an apparatus, a system, a device, instructions on a computer readable medium, or any desired combination of the above. Several inventive embodiments of the present invention are described below.

If desired, the circuitry for performing floating-point operations may further include a right shifter coupled to the multiplier circuit, a left shifter coupled to the storage circuit, and an additional left shifter coupled to the multiplier circuit and the subtractor circuit.

The configurable interconnect circuitry may include a first multiplexer coupled to the right shifter the multiplier circuit, and the subtractor circuit. The first multiplexer may select between the signals generated from the multiplier circuit and the signals generated from the right shifter, and the configurable interconnect circuitry may route the selected signals from the first multiplexer to the subtractor circuit.

The configurable interconnect circuitry may further include a second multiplexer coupled to the left shifter, the additional left shifter, the subtractor circuit, and an additional storage circuit storing a constant number. The second multiplexer may select among the signals received from the additional storage circuit, the signals generated from the left shifter, and the configurable interconnect circuitry may route the selected signals from the second multiplexer to the subtractor circuit.

If desired, the configurable interconnect circuitry may also include a third multiplexer coupled to the multiplier circuit, the subtractor circuit, and the storage circuit. The third multiplexer may select among the signals generated from the multiplier circuit, the signals generated from the subtractor circuit, and the signals generated from the storage circuit.

Further features of the invention, its nature and various advantages, will be more apparent from the accompanying drawings and the following detailed description of the preferred embodiments.

DETAILED DESCRIPTION

Figure 1:
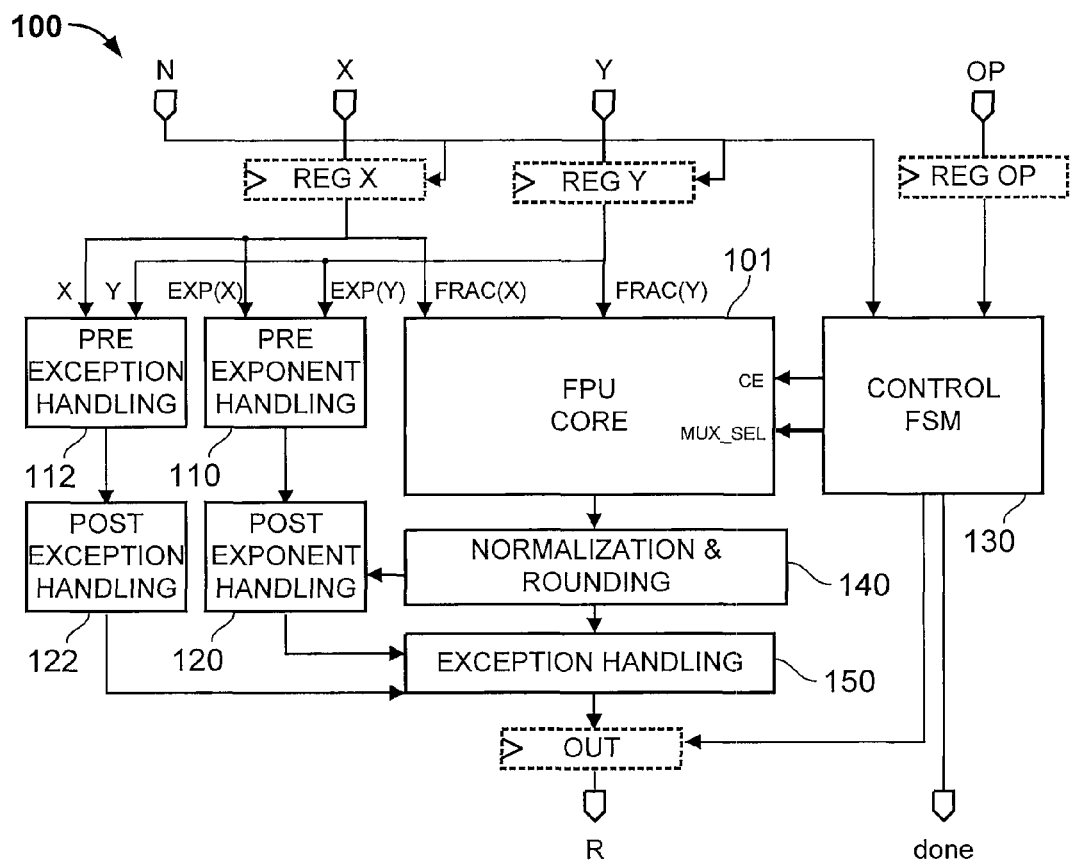
FIG. 1 is a diagram of an illustrative floating-point unit for performing arithmetic floating-point operations in accordance with an embodiment of the present invention.

Embodiments of the present invention relate to performing floating-point arithmetic operation on an integrated circuit and, more particularly, to a floating-point unit (FPU) that implements approximation techniques to perform floating-point arithmetic operations.

The floating-point format is one of the most common ways of representing real numbers in computer systems. Fixed-point number systems have a very limited window of representations which prevents them from representing very large or very small numbers simultaneously. For example, a fixed-point number of format Q(23.8) is represented using = bits. 23 bits are used for the integer part, eight bits are used for the fractional part, and one bit is used as a sign bit. This format may only represent integer values in the range from $-2^{23}$ to $2^{23}-2^{0}$ (–8) (i.e., from –8,388,608 to 8,388,607.99609375) with a resolution of $2^{0}$ (–8) (i.e., 0.00390625).

The position of the notational binary point in fixed-point numbers addresses this numeric range problem to a certain extent but does so at the expense of precision. With a floating-point number the window of representation can move, which allows the appropriate amount of precision for the scale of the number.

Floating-point representation provides a balance between numeric range and precision. Therefore, floating-point representation is generally preferred over fixed point representation in computing systems. However, floating point representation requires more complex implementation compared to fixed point representation.

Floating-point numbers and the corresponding arithmetic operations are often implemented in accordance with the IEEE754 standard, which defines a floating-point number as including a sign, a mantissa, and an exponent, and where the mantissa is required to be normalized at all times because the standard implies a leading "1."

Floating-point numbers may be processed by floating-point units that perform different floating-point arithmetic operations. Examples for floating-point arithmetic operations executed by floating-point units may include addition, subtraction, multiplication, division, and square root. Efficient implementation of operations such as division and square root are generally desirable because division and square root are among the most complex arithmetic operations and typically use a disproportionate amount of device resources compared to arithmetic operations such as addition or multiplication. The implementation of related arithmetic operations such as the inverse square root and the inverse operation are similarly resource intensive floating-point operations.

It may be desirable to build a floating-point unit that implements resource intensive arithmetic operations such as division, square root, inverse square root, and inverse operation in an efficient way. For example, a floating-point unit may use approximation techniques to implement at least some of these floating-point operations.

Approximation techniques for a floating-point operation may include methods that start from an initial solution and iteratively approach a final solution, which may be close enough to the exact solution of the floating-point operation in terms of a given precision. In such a scenario, computation may terminate after a given number of iterations, thereby guaranteeing a given latency at the expense of a potential loss in precision. The number of iterations may be configurable and defined by a user depending on the desired accuracy of the computed solution. The desired accuracy may also depend on the selected initial solution. A given precision may be reached with less iterations in the event that the initial solution is closer to the exact solution.

The use of approximation techniques for implementing a floating-point operation may be based on arithmetic operations that require less resources than the implementation of the floating point operation. For example, using such approximation techniques, the division operation may be implemented using a multiplier, a left shifter, and a subtractor when implementing the Newton-Raphson approximation method as described below.

In fact, several floating-point operations such as inverse square root, square root, division, multiplication, inverse, addition, and subtraction, and may all be computed via the Newton-Raphson method using a multiplier, a subtractor, a left shifter, and a right shifter, as well as configurable routing and storage circuitry to provide the initial solution. Combining, arithmetic operators such as multiplier, subtractor, left shifter, right shifter, and storage circuits together with configurable routing such that the resulting architecture is able to implement several floating-point operations such as the inverse square root, the square root, the division, the multiplication, the addition, the subtraction, and the inverse operation may provide a significant area advantage over conventional floating-point unit architectures, which use separate dedicated arithmetic operators for each of the arithmetic operations.

It will be obvious to one skilled in the art, that the present exemplary embodiments may be practiced without some or all of these specific details. In other instances, well-known operations have not been described in detail in order not to unnecessarily obscure the present embodiments.

FIG. 1 shows a logical diagram of an exemplary floating-point unit 100 according to an embodiment of the invention. Floating-point unit 100 may include a variety of different functional blocks such as control finite state machine (FSM) 130, floating-point unit (FPU) core 101, pre-exponent handling 110, post-exponent handling 120, pre-exception handling 112, post-exception handling 122, normalization and rounding 140, and exception handling 150.

The representation of the different functional blocks in FIG. 1 is merely illustrative and has been chosen to provide a better understanding of the functionality. If desired, floating-point unit 100 may combine some of the functional blocks together while other functional blocks may be further separated into sub-blocks. For example, pre-exception handling 112 and post-extension handling 122 may be folded into exception handling 150. Similarly, pre-exponent handling 110 and post-exponent handling 120 may be combined into a single exponent handling block. Alternatively, pre-exponent handling 110 and post-exponent handling 120 may be folded into FPU core 101.

Floating-point unit 100 may further include optional input and output registers such as registers REG X, REG Y, REG OP, and OUT. Floating-point unit 100 may also include additional registers to pipeline signals within the different functional blocks.

Floating-point unit 100 may receive two floating-point numbers X and Y each having a sign, a mantissa (e.g., FRAC (X) and FRAC (Y)), and an exponent (e.g., EXP (X) and EXP (Y)). Floating-point unit 100 may further receive a status information signal (e.g., signal N) and a signal to select an arithmetic operation to be implemented by the floating-point unit 100 such as signal OP.

Upon receiving a status information signal indicating that the floating-point unit 100 is ready to perform a new floating-point arithmetic operation, control FSM 130 may control the execution of the selected floating-point operation. Control FSM 130 may generate control signals and provide these control signals to other functional blocks such as the FPU core 101, the exponent handling blocks 110 and 120, the normalization and rounding block 140, and the exception handling blocks 112, 122, and 150. For example, control FSM 130 may generate multiplexer selection signals and clock enable signals and provide these signals to FPU core 101.

FPU core 101 may receive one or two mantissa portions of one or two floating-point numbers depending on the selected floating-point operation. For example, FPU core 101 may only receive the mantissa portion of one floating-point number if the selected operation is square root, inverse square root, or the inverse operation. FPU core 101 may receive the mantissa portions of two floating-point numbers if the selected operation is division, multiplication, addition, or subtraction. FPU core 101 may also receive control signals from control FSM 130. These control signals may schedule different sub operations within FPU core 101. These sub-operations may be executed serially in a given order, in parallel, or in a combination thereof as part of the computation of the mantissa portion of the floating-point arithmetic operation result.

The mantissa portion of the floating-point arithmetic operation result may be rounded and normalized in normalization and rounding block 140. For example, normalization may be preferred by shifting the mantissa portion of the result by a given amount of bit positions to the left or to the right while the corresponding exponent is decremented or incremented accordingly. Normalization may be required if the mantissa portion of the result is in a format that is not in accordance with the IEEE754 standard. Rounding may be required in the event that the exact mantissa portion of the result requires more bits than can be represented by floating-point unit 100 (i.e., in the event of an overflow). Normalization and rounding operations may depend on the selected floating point operation and may therefore be controlled by control FSM 130 as well.

Pre-exponent handling block 110 may receive the exponents of one or two floating-point numbers depending on the selected floating-point operation. Computing the exponent portion of the floating-point arithmetic operation result may depend on the selected floating-point operation. Hence, control FSM 130 may also control the computation of the exponent portion of the floating-point arithmetic operation result executed by functional blocks 110 and 120. The normalization and rounding of the mantissa portion of the result may require an additional adjustment of the exponent portion of the result. For example, the exponent portion of the result needs to be decremented by the number of bit positions that the mantissa portion of the result is shifted to the left. Similarly, the exponent portion of the result needs to be incremented by the number of bit positions that the mantissa portion of the result is shifted to the right.

Exception handling block 112 may receive one floating-point number having a sign, a mantissa, and an exponent if the selected floating-point arithmetic operation is square root, inverse square root, or the inverse operation. Exception handling block 112 may receive two floating-point numbers each having a sign, a mantissa, and an exponent if the selected floating-point arithmetic operation is division, multiplication, addition, or subtraction.

Exception handling depends on the selected floating-point arithmetic operation and on the received floating-point numbers. For example, the inverse square root operation requires exception handling if the floating-point number is either zero or negative. The IEEE754 standard defines exception handling for the inverse square root operation as follows: in the event that the floating-point number is positive zero, the result is positive infinity. The result is negative infinity if the floating-point number is negative zero, whereas the result is "not-a-number" (NaN) if the floating-point number is smaller than zero.

The result of the floating-point arithmetic operation may be stored in an optional register (e.g., optional register OUT in FIG. 1). Upon completion of a floating-point arithmetic operation, control FSM 130 may output a status information signal (e.g., status information signal "done" in FIG. 1) to indicate that floating-point unit 100 is ready to receive a new floating-point arithmetic operation.

Figure 2:
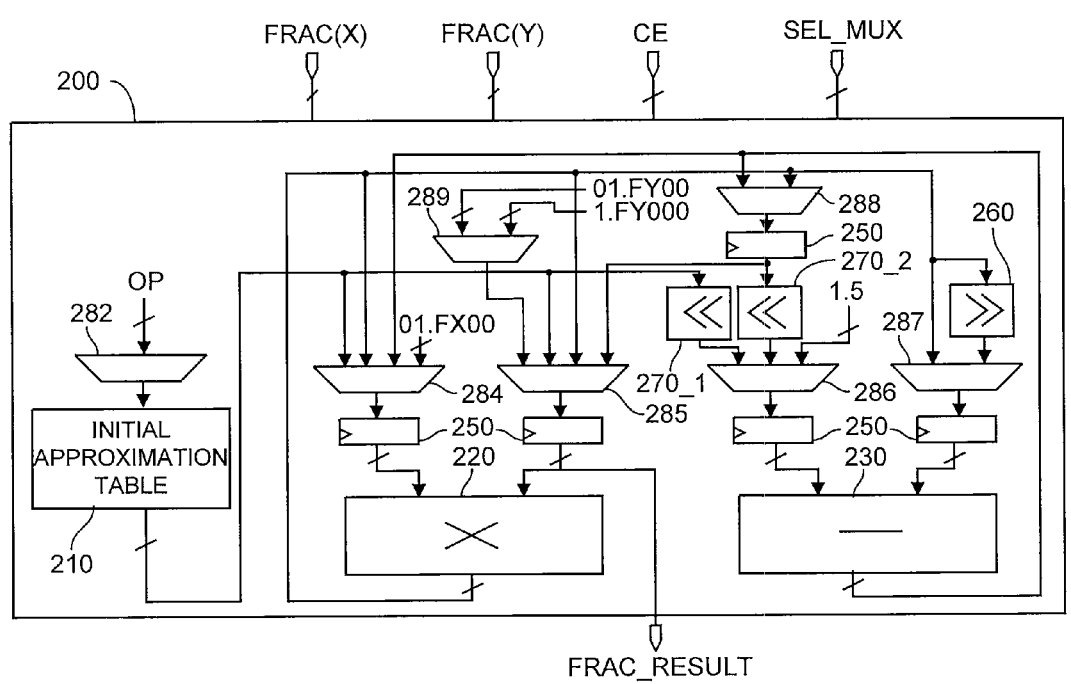
FIG. 2 is a diagram of an illustrative floating-point unit core for computing the mantissa of an arithmetic floating-point operation in accordance with an embodiment of the present invention.

FIG. 2 shows a logical representation of an embodiment of a floating-point unit core 200 which may be used in floating-point unit 100 to compute the mantissa portion of the floating-point arithmetic operation result similar to the tasks performed by FPU core 101 in FIG. 1. FPU core 200 may include initial approximation table 210, multiplier 220, subtractor 230, registers 250, right shifter 260, left shifters 270_1 and 270_2, and multiplexers 282, 284, 285, 285, 287, 288, and 289.

In logical representation of FPU core 200, implementation details, such as some registers and multiplexers are omitted to simplify the discussion. For example, the routing of control signals CE or SEL_MUX within FPU core 200 or the padding of input signals such as mantissas FRAC(X) and FRAC(Y) with zeros to generate signals 01.FY00, 1.FY000, and 01.FX00, as well as the routing of the respective padded mantissas to multiplexers 289 and 284 are omitted. In addition, some elements that are shown may, in actual embodiment, be implemented differently. For example, the multiplier 220 may actually represent two or more multipliers, the left shifters 270_1 and 270_2 may be replaced by a single left shifter with an additional multiplexer on the input, the multiplexers 285 and 289 may be merged into a single multiplexer, or the subtractor 230 may actually implement a subtraction and an addition operation, just to name a few implementation alternatives.

Multiplier 220 and subtractor 230 may handle any number type such as integers, fixed-point numbers, or floating-point numbers. Multiplier 220 and subtractor 230 may have optional pipeline registers 250 coupled to their inputs that are driven by input selection multiplexers 284, 285, 286, and 287. Pipeline registers 250 may be bypassed, for example by using additional multiplexers (not shown) which may switchably couple pipeline registers 250 to the input of multiplier 220 and subtractor 230 and receive signals from pipeline registers 250 and respective input selection multiplexers 284, 285, 286, or 287.

Input selection multiplexers 284, 285, 286, and 287 may be used to switchably couple one of their inputs to the respective operand input of multiplier 220 and subtractor 230. For example, input multiplexer 284 may receive signals from initial approximation table 210, from multiplier 220, from subtractor 230, or from one of the mantissas on the input of FPU core 200 (e.g., 01.FX00). Input selection multiplexer 285 may receive one of the mantissas of the input of FPU core 200 or a shifted version of that input (e.g., such as the signals selected by multiplexer 289). Input selection multiplexer 285 may further receive signals from initial approximation table 210, from multiplier 220, and from a pipelined output of multiplier 220 or subtractor 230 as selected by multiplexer 288 and stored by register 250.

Input selection multiplexer 287 may select between a signal received from multiplier 220 directly and the same signal from multiplier 220 right shifted by one bit position using right shifter 260. Input selection multiplexer 286 may select among signals received from left shifters 270_1 and 270_2 and a constant signal representing the number 1.5 explained below.

FPU core 200 may compute approximation values for the mantissa portion of the floating-point arithmetic operation result using approximation techniques such as the Newton-Raphson techniques for computing the inverse square root and the inverse operation. The Newton-Raphson method is an iterative method for determining a root y of a function f(y) (i.e., determine the value of y for which f(y)=0). The method starts with choosing an initial value y0. The next iteration value y1 is determined as:

$$y1 = y0 - f(y0)/f'(y0) \quad (1)$$

where f(y0) represents the value of function f at position y=y0, and where f' (y0) represents the first derivative of function f with respect to y (i.e., df/dy) at position y=y0. Similarily, any subsequent iteration values at iteration (n+1) (i.e., y(n+1)) are dependent on iteration values yn determined during the previous iteration n:

$$y(n+1) = yn - f(yn)/f'(yn) \quad (2)$$

As an example, the Newton-Rhapson method may determine the inverse of a number x by finding the root y of a function f(y)=1/y−x with f' (y)=−1/y². Therefore, y(n+1) may be computed based on yn as:

$$y(n+1) = 2yn - x*yn^2 \quad (3)$$

Similarly, the Newton Rhapson method may be used to determine the inverse square root of a number x by finding the root y of a function f(y)=1/y²−x with f'(y)=−2/y³. Therefore, y(n+1) may be computed based on yn as:

$$y(n+1) = yn*(1.5 - x*yn^2/2) \quad (4)$$

FPU core 200 may store initial values for performing the Newton-Raphson method initial approximation table 210. Initial approximation table 210 may be any storage circuit capable of storing and retrieving floating-point mantissas such as a flash memory, static random-access memory (SRAM), or dynamic random-access memory (DRAM), just to name a few. The initial value may be selected based on the floating-point arithmetic operation to ensure convergence of the iteration.

Figure 3:
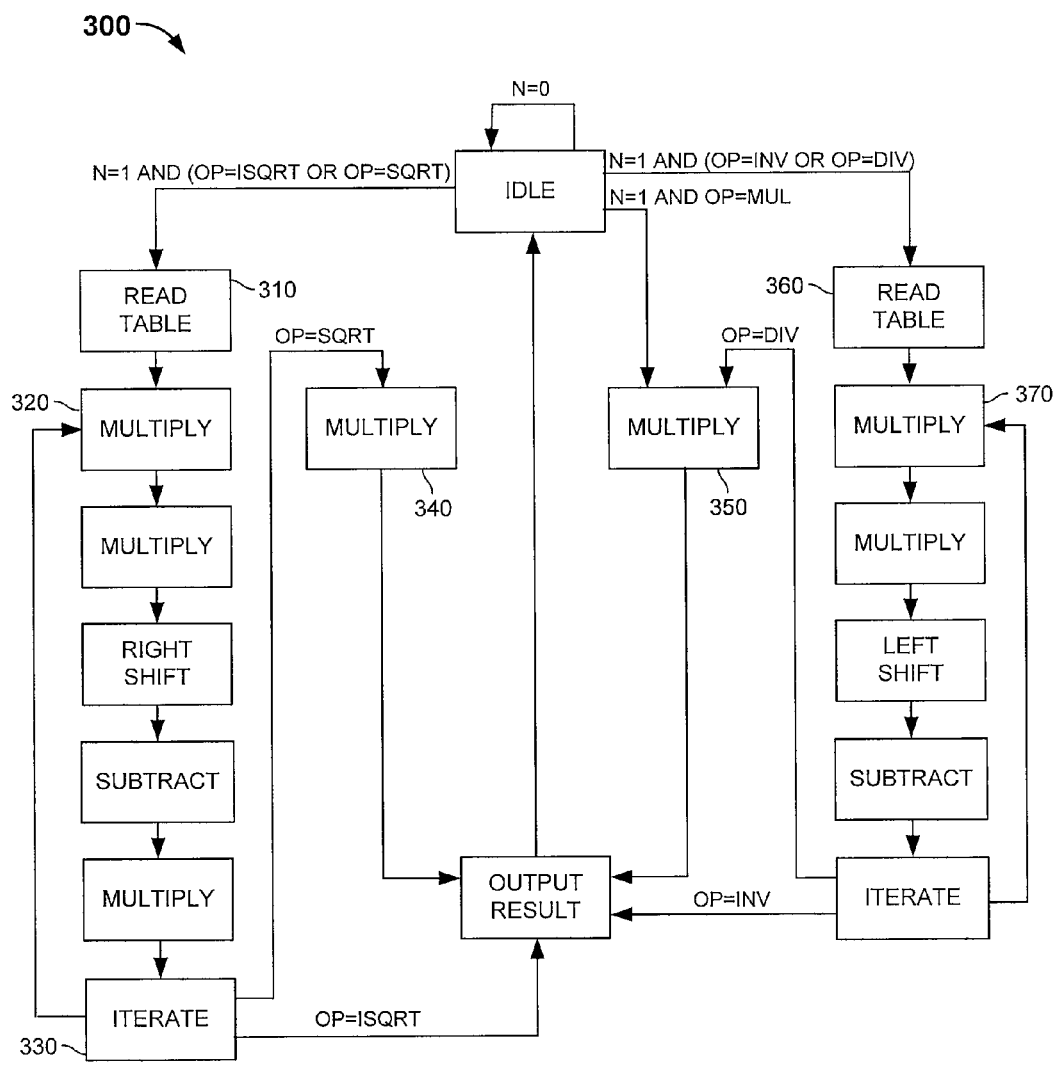
FIG. 3 is a diagram of an of an illustrative finite state machine for controlling a floating-point unit core in accordance with and embodiment of the present invention.

The operation of FPU core 200 and the allocation and execution order of operations (e.g., through configuration of multiplexer selection selection signals) may be controlled by a state machine (e.g., by control FSM 130 in FIG. 1). FIG. 3 shows a state transition diagram 300 of an embodiment of a state machine that controls the execution of a floating-point arithmetic operation according to the Newton-Raphson method in a floating-point unit core such as FPU core 200. FIGS. 4A-4E illustrate the allocation of arithmetic operations to the different blocks of FPU core 200 in the order these arithmetic operations are executed as a result of the state machine's control signals. Multiplexers are shown in FIGS. 4A-4E to illustrate that an arithmetic operator such as multiplier 220 or subtractor 230 may receive the initial value read from initial approximation table 210 or the result of a previous iteration.

Referring back to FIG. 1, a floating-point unit such as floating-point unit 100 may operate using a status variable such as variable N, which indicates whether floating-point unit 100 is currently executing a floating-point arithmetic operation. For example, N may be "0" if floating-point unit 100 is ready to receive a floating-point arithmetic operation, and N may be "1" if floating-point unit 100 is currently executing a floating-point arithmetic operation. Hence, the state machine may remain in state IDLE for as long as N is "0". The state machine may change to another state if N is "1" when floating-point unit 100 receives a new operation.

The transition from state IDLE to another state may depend on the selected floating-point aritmetic operation. The floating-point arithmetic operation may be determined by a variable such as variable OP. For example, if the operation to be executed on floating-point unit 100 is the inverse square root operation, then variable OP may take the value ISQRT. Similarily, if the selcted floating-point arithmetic operation is square root, multiplication, division, or the inverse operation, variable OP may take values SQRT, MUL, DIV, and INV, respectively. Variable OP may be set to other values depending on the selected floating-point arithmetic operations. For example, the variable OP may be set to yet other values in case of additional floating-point arithmetic operations, such as ADD or SUB operations assition or subtraction, just to name a few.

Consider the scenario in which the selected operation is the inverse square root or the square root (i.e., OP=ISQRT or OP=SQRT) of a floating-point number X, where x is the mantissa of this floating-point number X. In this scenario, the state machine may direct an FPU core (e.g., FPU core 200 of FIG. 2) to implement equation (4) above (see FIG. 4A for the allocation and execution order of operations in FPU core 200 for the implementation of the inverse square root operation and FIG. 4B for the allocation and execution order of operations in FPU core 200 for the implementation of the square root operation). For this purpose, the state machine may transition from state IDLE to state READ TABLE 310. During state 310, FPU core 200 may read an initial value y0 from a storage circuit (e.g., initial approximation table 210 in FIGS. 2, 4A, and 4B). The state machine may then transition to state MULTIPLY 320 in which y0 may be multiplied with itself (e.g., by configuring multiplexers 284 and 285 to select the signal coming from initial approximation table 210 for multiplication in multiplier 220_1) to produce the product y0².

Next, the state machine may transition from state 320 to another MULTIPLY state in which the product y0² may be multiplied with the mantissa of floating-point number x (e.g., by configuring multiplexer 284 to select the mantissa of X, by configuring 285 to select the signal coming from the output of multiplier 220_, and by executing the multiplication using multiplier 220_2). The result of this multiplication may be divided by 2 to implement x*y0²/2. A division by 2 in binary format is equivalent to shifting a binary number one bit position to the right. The right shift may be performed in state RIGHT SHIFT (e.g., by shifting the output of the multiplier 220_2 one bit position to the right using right shifter 260.

The state machine may then transition from state RIGHT SHIFT to state SUBTRACT. During state SUBTRACT, the result of the right shift operation may be subtracted from the constant 1.5 to implement 1.5−x*y0²/2 (e.g., by configuring multiplexer 286 to read the constant 1.5, by configuring multiplexer 287 to select the output of right shifter 260, and by executing the subtraction in subtractor 230). The result of the subtraction operation may then be multiplied with the initial value y0 to implement equation (4) above (e.g., by configuring multiplexer 284 to select the output of subtractor 230, by configuring multiplexer 285 to select the signal coming from initial approximation table 210, and by executing the multiplication using multiplier 220_3). For this purpose, the state machine may transition from the SUBTRACT state to the MULTIPLY state.

Next, the state machine may transition to state ITERATE 330 to determine whether an additonal iteration is required. Such an additional iteration corresponds to a transition from state 330 back to state MULTIPLY 320 for subsequent iterations using for every interation the computation result available in state 330 as the initial value in state 320. The state machine may transition from state 330 to state 320 for a constant number of iterations. The constant number of iterations may depend on the accuracy of the initial approximation table 210. For example, the Newton-Raphson method has a known quadratic convergence. Thus, the accuracy of the result may double with each iteration and an initial approximation table 210 that stores 7-bit numbers may guarantee an accuracy of 28 bits after two iterations, which is sufficient for a single-precision floating-point operation.

Alternatively, the number of iterations may depend on some criterion or combination of criteria. For example, the iteration may terminate if a desired precision is reached (e.g., if the value yn during iteration n and the value y(n+1) during iteration n+1 are identical). As another example, the iteration may terminate the earlier of a reached precision (e.g., the absolute value of the difference between y(n+1) and yn is smaller than a given threshold) or a fixed number of m iterations.

Once the iterations have terminated, the state may transition from state 330 to state OUTPUT RESULT if the selected floating-point arithmetic operation is the inverse square root operation (i.e., if OP=ISQRT). In the event that the selected floating-point arithmetic operation is the square root operation (i.e., OP=SQRT), the state machine may transition to state 340 instead. In state 340, the FPU core may multiply the result of the inverse square root operation with the mantissa of the floating-point number X to determine the square root of x (e.g., by configuring 285 to select the signal coming from the output of multiplier 220_3, and by executing the multiplication operation using multiplier 220_4 in FIG. 4B). Then, the state machine may transition from state 340 to the OUTPUT RESULT state.

Figure 4A:
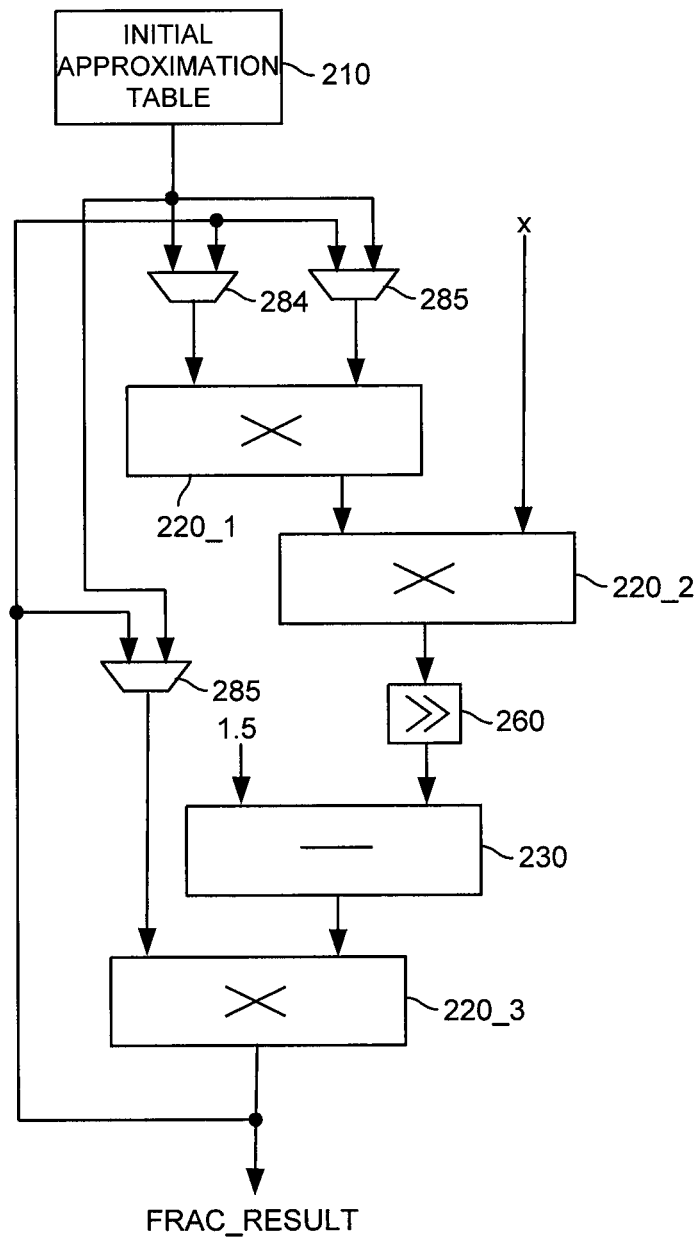
FIG. 4A is a diagram of illustratively allocating the execution of arithmetic operations in the floating-point unit core of FIG. 2 to implement the inverse square root operation in accordance with an embodiment of the invention.
Figure 4B:
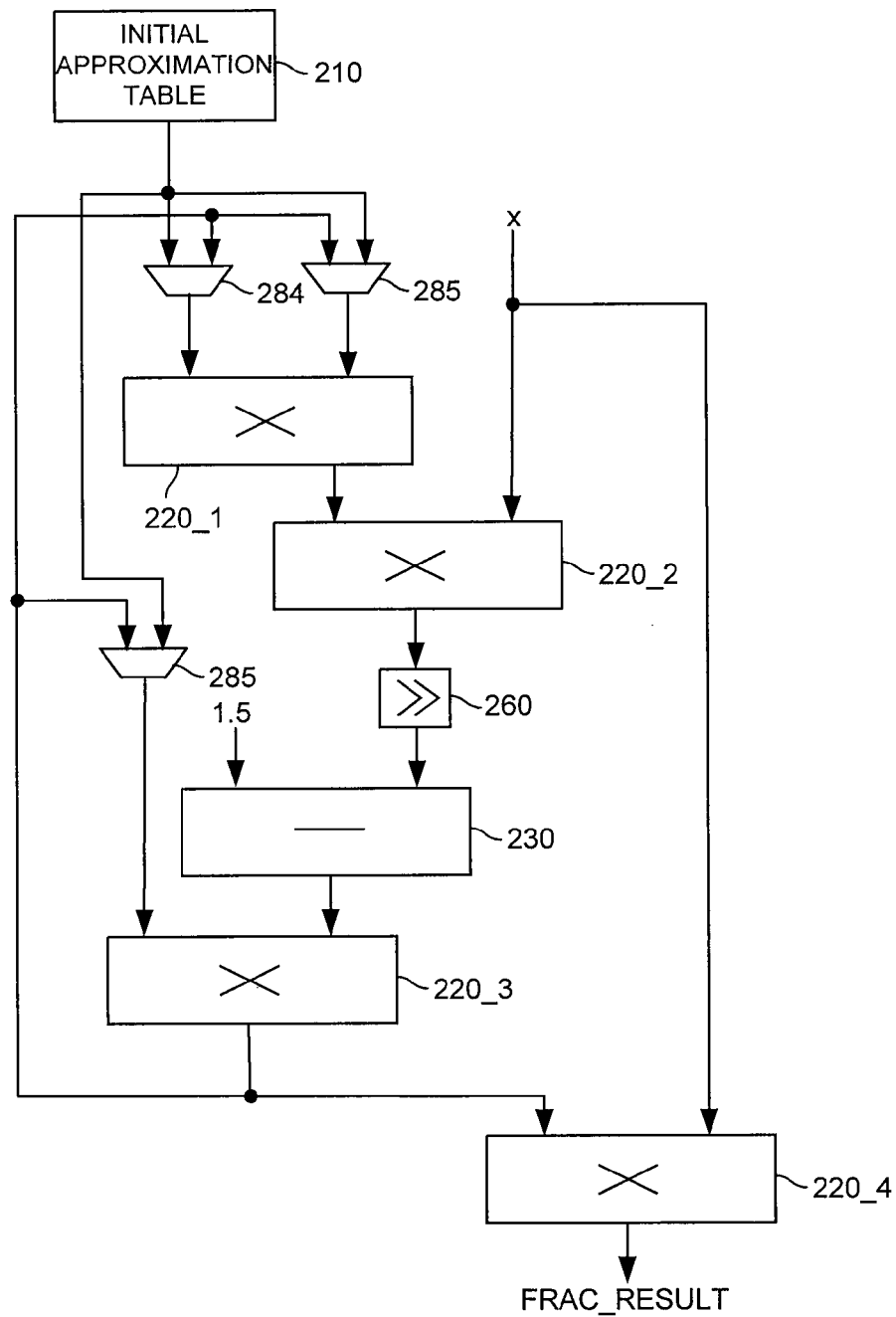
FIG. 4B is a diagram of illustratively allocating the execution of arithmetic operations in the floating-point unit core of FIG. 2 to implement the square root operation in accordance with an embodiment of the invention.
Figure 4C:
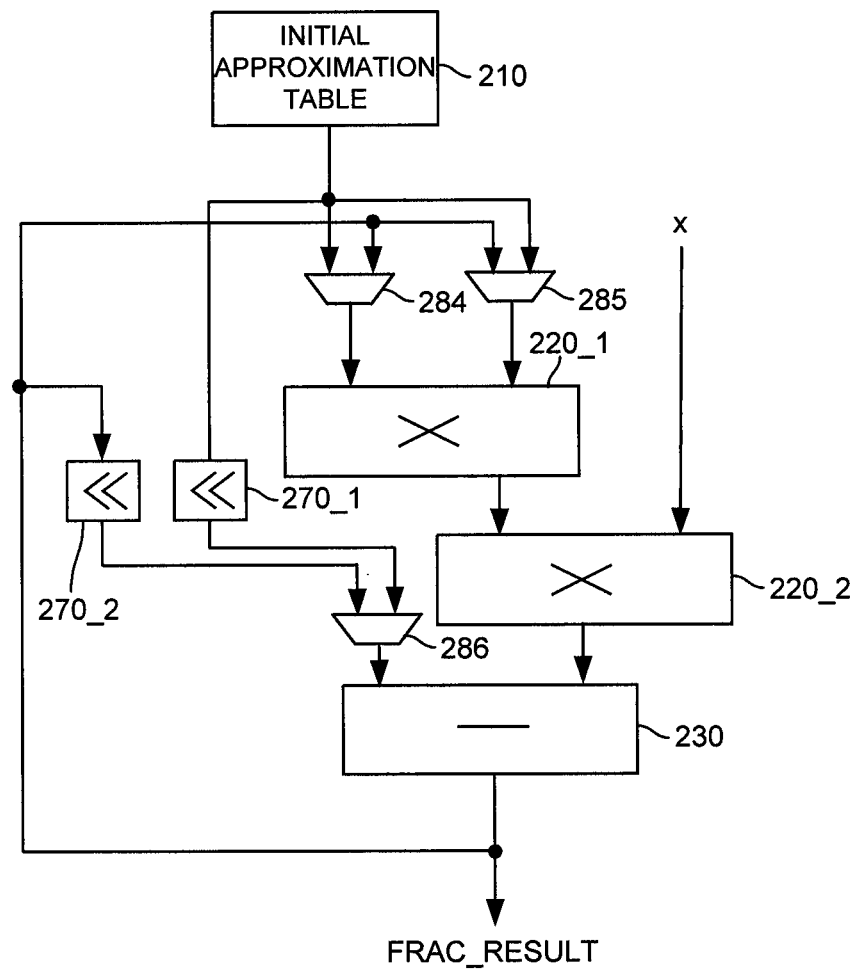
FIG. 4C is a diagram of illustratively allocating the execution of arithmetic operations in the floating-point unit core of FIG. 2 to implement the inverse operation in accordance with an embodiment of the invention.
Figure 4D:
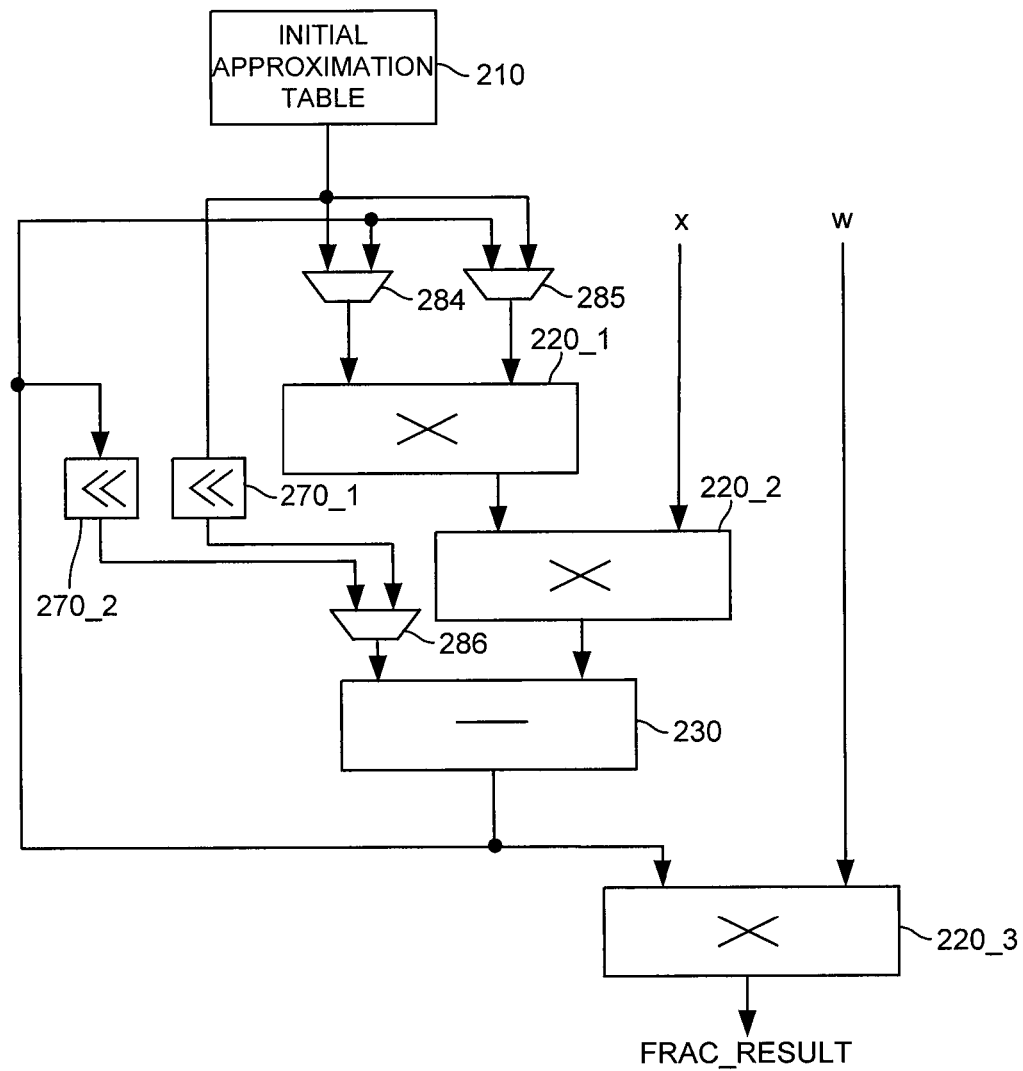
FIG 4D is a diagram of illustratively allocating the execution of arithmetic operations in the floating-point unit core of FIG. 2 to implement the division operation in accordance with an embodiment of the invention.
Figure 4E:
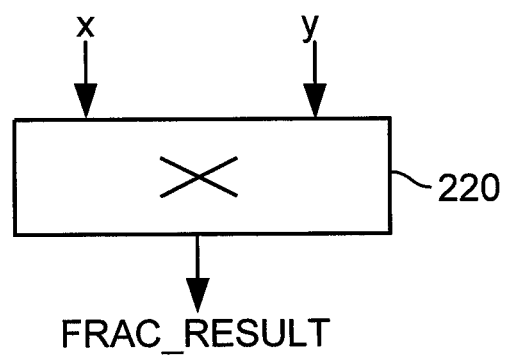
FIG. 4E is a diagram of illustratively allocating the execution of arithmetic operations in the floating-point unit core of FIG. 2 to implement the multiplication operation in accordance with an embodiment of the invention.

During the OUTPUT RESULT state, the FPU core may provide the result of floating-point arithmetic operation to the output (e.g., by configuring multiplexer 285 to select the signal coming from the output of multiplier 220_3 in FIG. 4A in case the selected operation is the inverse square root of the signal coming from the output of multiplier 220_4 in FIG. 4B in case the selected operation is the square root). The state machine may also provide a status signal indicating that the floating-point arithmetic operation has terminated (e.g., by providing a signal such as signal "done" in FIG. 1), which may result in status variable N being set to "0". Thereafter, the state machine may transition from state OUTPUT RESULT back to state IDLE.

Consider the scenerio in which the selected operation is the inverse operation (i.e., OP=INV) of a floating-point number X with x being the mantissa X or in which the elected operation is the division (i.e., OP=DIV) of two floating-point numbers W/X with w and x being the mantissa of W and X, respectively. In these scenerios, the state machine may direct an FPU core (e.g., FPU core 200 of FIG. 2) to implement equation (3) above (see, e.g., FIG. 4C for the allocation and execution order of operations in FPU core 200 for the implementation of the inverse operation and FIG. 4D for the allocation and execution order of operation in FPU core 200 for the implementation of the division operation). For this purpose, the state machine may transition from state IDLE to state READ TABLE 360. During state 360, FPU core 200 may read an initial value y0 from a storage circuit (e.g., initial approximation table 210 in FIGS. 2, 4C, and 4D.) The state machine may then transition to state 370 in which y0 may be multiplied with itself (e.g., by configuring multiplexers 284 and 285 to select the signal coming from initial approximation table 210 from multiplication in multiplier 220_1) to produce the product $y0^2$.

Next, the state machine may transition from state MULTIPLY 370 to another MULTIPLY state in which the product $y0^2$ may be multiplied with the mantissa of floating-point number x (e.g., by configuring multiplexer 284 to select the mantissa of X, by configuring multiplexer 285 to select the signal coming from the output of multiplier 220_, and by executing the multiplication of these two signals using mulitiplier 220_2).

The initial value may also be multiplied by 2 to implement 2*y0. A multiplication by 2 in binary format is equivalent to shifting a binary number one bit position to the left. The left shift may be performed in state LEFT SHIFT (e.g., by shifting the initial value one bit position to the left using left shifter 270_1).

The state machine may then transition from state LEFT SHIFT to state SUBTRACT. During state SUBTRACT, the result of the multiplication operation $x*y0^2$ may be subtracted from the result of the left shift operation to implement equation (3) above (e.g., by configuring multiplexer 286 to read the output of left shifter 270_1, by configuring multiplexer 287 to select the result of multiplier 220_2, and by executing the subtraction using subtractor 203).

Next, the state machine may transition to state ITERATE to determine whether additional iterations are required. For this purpose, the state machine may transition from stage ITERATE back to state 370 for subsequent iterations using for every iteration the computation result available in state ITERATE as the initial value in state 370. The state machine may transition from state SUBTRACT to state 370 for a constant number of iterations. Alternatively, the number of iterations may depend on some criterion or combination of criteria. For example, the iteration may terminate if a desired precision is reached (e.g., if the value yn during iteration n and the value y(n+1) during iteration n+1 are identical). As another example, the iteration may terminate the earlier of a reached precision (e.g., the absolute value of the difference between y(n+1) and yn is smaller than a given threshold) or a fixed number of m iterations.

Once the iterations have terminated, the state machine may transition from state ITERATE to state OUTPUT RESULT if the selected floating-point arithmetic operation is the inverse operation (i.e., if OP=INV). In the event that the selected floating-point arithmetic operation is the division operation (i.e., OP=DIV), the state machine may transition to state 350 instead. While the state machine is in state 350, the FPU core may multiply the result of the inverse operation with the mantissa of the floating-point number W to determine the result of the division (e.g., by configuring multiplexer 285 to select the mantissa of W, by configuring 284 to select the signal coming from the output of subtractor 230, and by executing the multiplication operation using multiplier 220_3 in FIG. 4D). Then, the state machine may transition from state 370 to state OUTPUT RESULT.

During the OUTPUT RESULT state, the FPU core may provide the result of the floating-point arithmetic operation to the output as described above. Thereafter, the state machine may transition from state OUTPUT RESULT back to state IDLE.

Other floating-point arithmetic operations such as the addition, subtraction, or multiplication may not require the computation of an approximation using the Newton-Raphson method. For example, consider the scenario in which the selected operation is the multiplication (i.e., OP=MUL) of two floating-point numbers X*Y with x and y being the mantissas of X and Y, respectively. In this scenario, the state machine may transiton from state IDLE to state MULTIPLY 350 in which the mantissa of X is multiplied with the mantissa of Y (e.g., in FIG. 2 and 4E by configuring multiplexer 284 to select the mantissa of X, by configuring multiplexer 285 to select the mantissa of Y, and by executing the multiplication using multiplexer 220). Next, the state machine may transition from state 350 directly to state OUTPUT RESULT.

Although the state transitions were described in a specific order, it should be understood thaat other states may be performed in between described states. State transitions may also occur in a different order. The order of state transitions may depend on the architecture of the floating-point unit that the state machine controls. Some state transitions may also have another order (e.g., based on the commutative, associative, and distributive properties of operations). For example, states MULTIPLY, MULTIPLY, and RIGHT SHIFT may have any order such as RIGHT SHIFT followed by MULTIPLY and MULTIPLY or MULTIPLY followed by RIGHT SHIFT and another MULTIPLY, just to name a few alternative orders.

In addition to computing the mantissa portion of the floating-point arthmetic operation result, floating-point unit 100 may also handle exceptions, determine the sign, and compute the exponent portion of the floating-point arithmetic operation result, which is illustrated using flow charts in FIGS. 5A-5D.

Figure 5A:
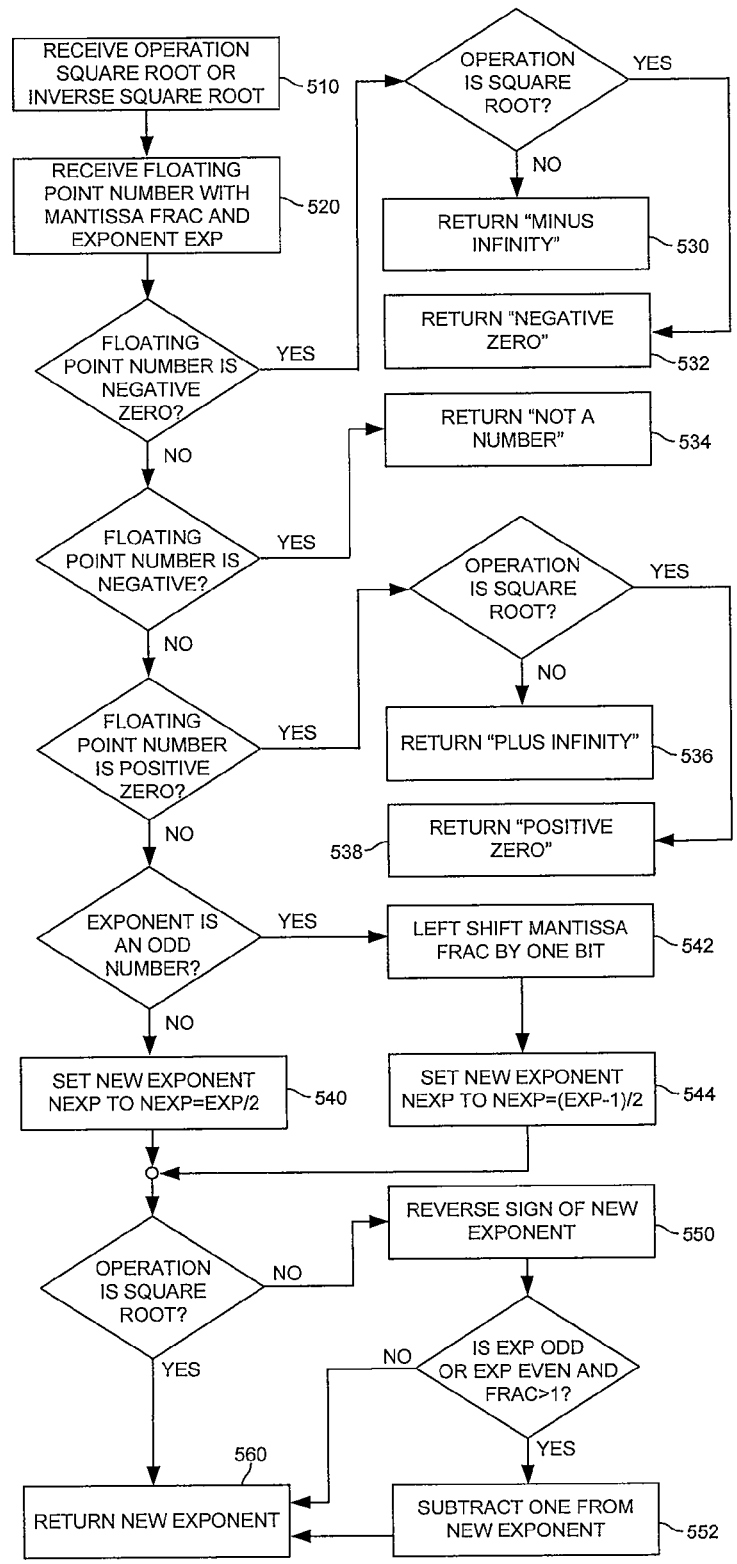
FIG 5A is a flow chart of illustrative steps for handling exceptions, normalization, and the computation of the exponent for the square root and the inverse square root operation in the floating-point unit of FIG. 1 in accordance with an embodiment of the present invention.

Consider the scenario in which floating-point unit 100 receives the square root or the inverse square root operation (e.g., during step 510 of FIG. 5A). During step 520, the floating-point unit may receive a floating-point number having a sign, a mantissa, and an exponent.

A first check may verify whether the floating-point number is negative zero (i.e., to determine whether the mantissa is zero and the sign is negative, which the IEEE754 standard defines as setting the corresponding sign bit to "1"). In response to determining that the floating-point number is negative zero, the floating-point unit may return "negative zero" (−0) during step 532 if the selected floating-point arithmetic operation is the square root operation or the floating-point unit may return "minus infinity" (−∞) during step 530 if the selected floating-point arithmetic operation is the inverse square root.

In response to determining that the floating-point number is not negative zero, a next check may verify whether the floating-point number is negative. In the event that the floating-point number is negative, the floating-point unit may return "not a number" (NaN) during step 534. This convention has been adopted since the square root of a negative number is undefined. In case of a positive floating-point number, another step may verify whether the floating-point number is positive, which the IEEE754 standard defines as setting the corresponding sign bit to "0"). In response to determining that the floating-point number is positive zero, the floating-point unit may return "positve zero" (+0) during step 538 if the selected flaoting-point arithmetic operation is the square root operation or the floating-point unit may return "plus infinity" (+∞) during step 536 if the selected floating-point arithmetic operation is the inverse square root.

During step 540, the new exponent (NEXP) may be determined as the exponent of the floating-point number (EXP) divided by two (i.e., NEXP=EXP/2) in the event that the received floating-point number is positive and the received exponent an even number. In the event that the received floating-point number is positve and the exponent an odd number, the mantissa of the received floating-point number may be shifted to the left by one bit during step 542, and the new exponent may be determined as half of the exponent of the floating-point number minus one (i.e., NEXP=(EXP−1)/2.

No further handling of the new exponent such as adjustments for normalization of the mantissa portion of the result is required if the received operation is the square foot operation, and the new exponent may be returned during step 560. Further adjustments to the new exponent are required if the received operation is not the square root operation (i.e., the received operation is the inverse square root operation). During step 550, the sign of the new expenonet may be inversed (i.e., NEXP=−NEXP).

Normalization of the mantissa portion of the result may be required if the exponent of the received floating-point number is an odd number or if the mantissa of the received floating-point number is bigger than one (i.e., FRAC>1 OR (EXP mod 2)≠0). In response to determining that normalization of the mantissa portion of the result is required, subtract one from the new exponent during step 552 (i.e., NEXP=NEXP−1), and return the new exponent during step 560.

Figure 5B:
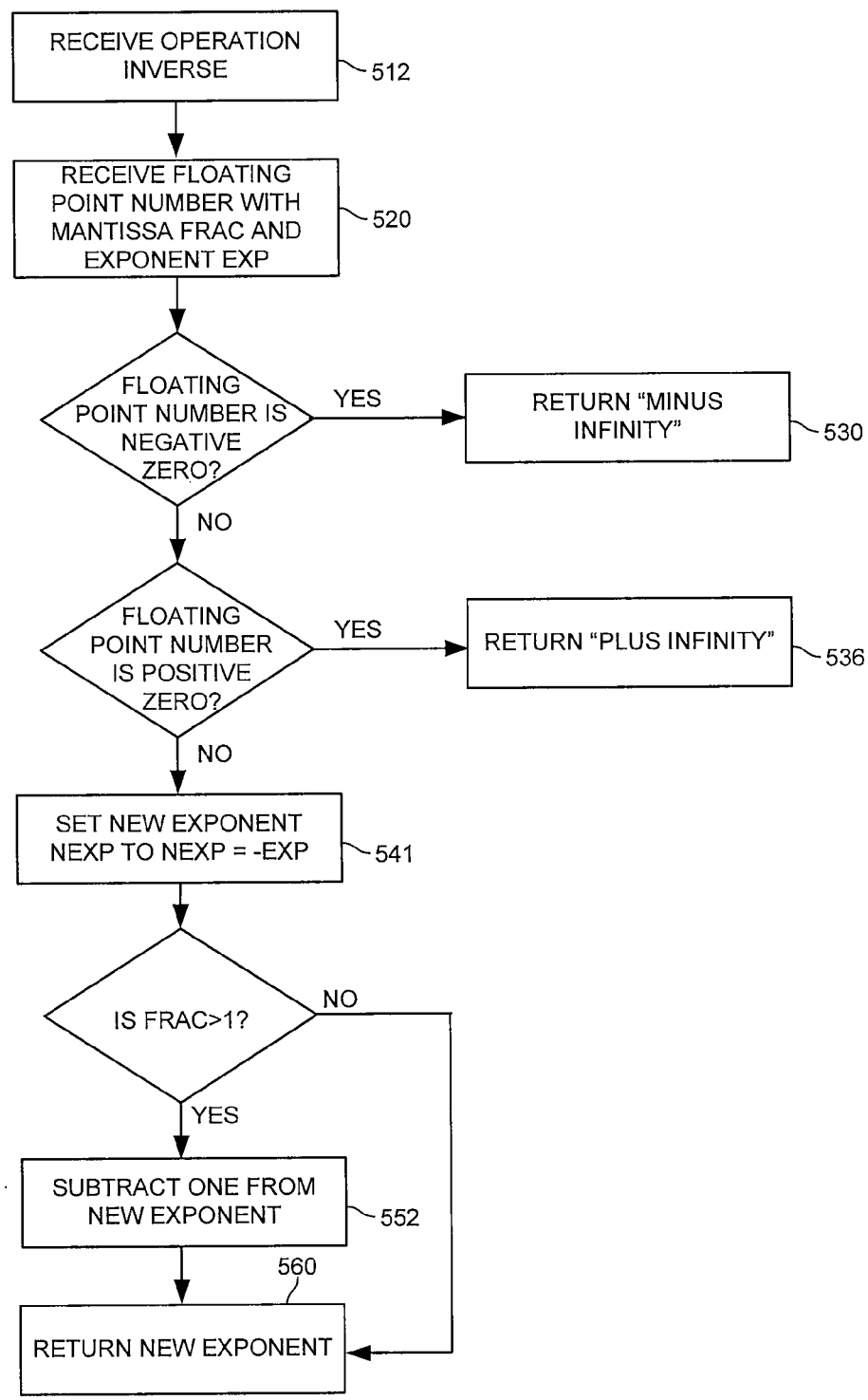
FIG. 5B is a flow chart of illustrative steps for handling exceptions, normalization, and the computation of the exponent for the inverse operation in the floating-point unit of FIG. 1 in accordance with an embodiment of the present invention.

Consider the scenario in which floating-point unit 100 receives the inverse operation (e.g., during step 512 of FIG. 5B). During step 520, the floating-point unit may receive a floating-point number having a sign, a mantissa (FRAC), and an exponent (EXP).

A first check may verify whether the floating-point number is negative zero. In response to determining that the floating-point number is negative zero, the floating-point unit may return "minus infinity" (−∞) during step 530. In response to determining tha the floating-point number is not negative zero, a next check may verify whether the floating-point number is positve zero. In response to determining that the floating-point number is positive zero, the floating-point unit may return "plus infinity" (+∞) during step 536.

During step 541, the new exponent (NEXP) may be dtermined as the exponent of the received floating-point number (FRAC) is not greater than "1", and the new exponent may be returned during step 560.

Normalization of the mantissa portion of the result may be required if the mantissa of the received floating-point number is bigger than one (i.e., FRAC>1). In response to determining that normalization of the mantissa portion of the result is required, subtract one from the new exponent during step 552 (i.e., NEXP=NEXP−1), and return the new exponent during step 560.

Figure 5C:
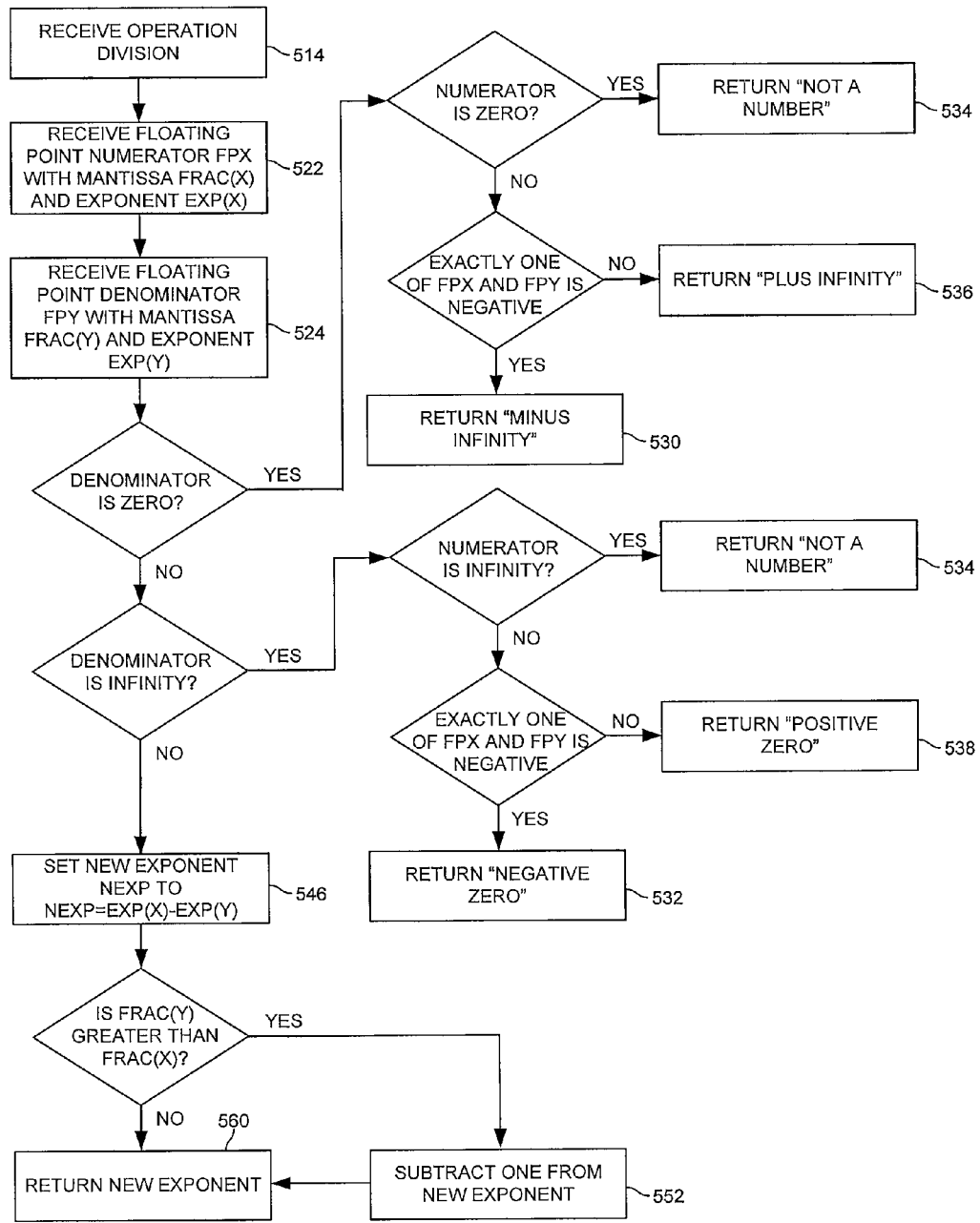
FIG. 5C is a flow chart of illustrative steps for handling exceptions, normalization, and the computation of the exponent for the division operation in the floating-point unit of FIG. 1 in accordance with an embodiment of the present invention.

Next, consider the scenario in which floating-point unit 100 receives the division operation (e.g., during step 514 of FIG. 5C). During step 522, the floating-point unit may receive a first floating-point number X having a sign, a mantissa (FRAC(X)), and an exponent (EXP(X)), which may be the numerator of the division operation. During step 524, the floating-point unit may receive a second floating-point number Y having a sign, a mantissa (FRAC(Y)), and an exponent (EXP(Y)), which may be the denominator of the division operation.

A first check may verify whether the denominator is zero (i.e., FRAC(Y)=0). In response to determining that the denominator is zero, the floating-point unit may return "not a number" (NaN) during step 534 if the numerator is also zero (i.e., FRAC(X)=0). In response to determining that the numerator is not zero, the floating-point unit may return "minus infinity" (−∞) during step 530 if exactly one of the numerator and the denominator is negative, or the floating-point unit may return "plus infinity" (+∞) during step 536 if both of the numerator and the denominator are either positive or negative.

In response to determining that the floating-point number is not zero, a next check may verify if the denominator is infinity. In the event that the denominator is infinity, the floating-point unit may return "not a number" (NaN) during step 534 if the numerator is also infinity. In response to determining that the numerator is also not infinity, the floating-point unit may return "negative zero" (−0) during step 532 if exactly one of the numerator and the denominator is negative, or the floating-point unit may return "positive zero" (+0) during step 538 if both of the numerator and the denominator are either positive or negative.

During step 546, the new exponent (NEXP) may be determined as the differences betweeen the exponent of the numerator and the exponent of the denominator (i.e., NEXP=EXP(X)−EXP(Y)).

No further handling of the new exponent such as adjustments for normalization of the mantissa portion of the result is required if the mantissa portion of the numerator is greater or equal to the mantissa portion of the denominator (i.e., FRAC(Y)<=FRAC(X)). Further adjustments to the new exponent are required if the mantissa portion of the denominator is greater than the mantissa portion of the numerator (i.e., FRAC(X)<FRAC(Y)). In this scenario, the mantissa portion of the division X/Y may be in the interval 0.5<=FRAC(X)/FRAC(Y)<1 which requires shifting the mantissa portion of the result one bit position to the left. Therefore, in response to determining that normalization of the mantissa portion of the result is required, subtract one from the new exponent during step 552 (i.e., NEXP=NEXP−1), and return the new exponent during step 560.

Figure 5D:
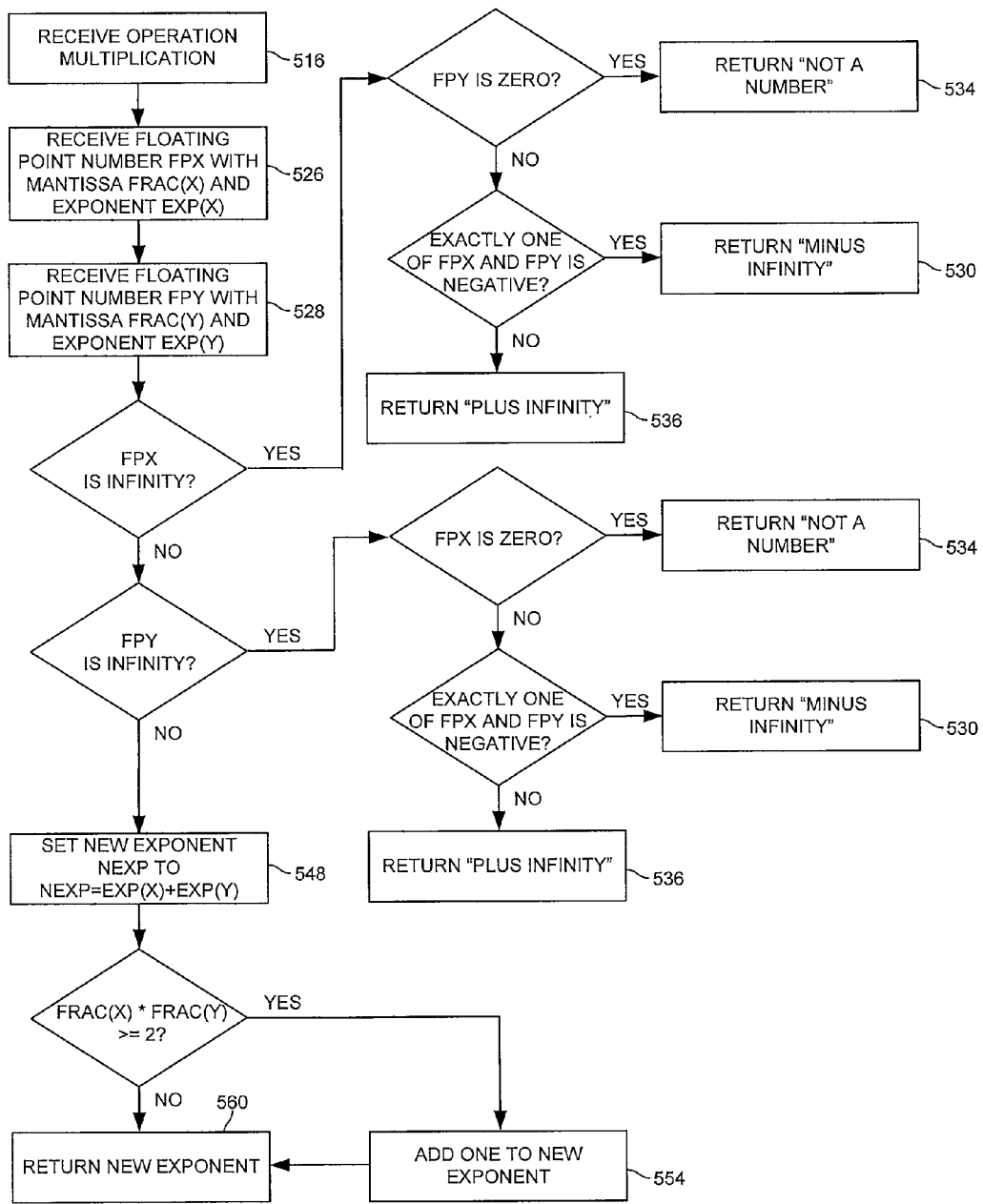
FIG. 5D is a flow chart of illustrative steps for handling exceptions, normalization, and the computation of the exponent for the multiplication operation in the floating-point unit of FIG. 1 in accordance with an embodiment of the present invention.

Finally, consider the scenario in which floating-point unit 100 receives the multiplication operation (e.g., during step 516 of FIG. 5D). During step 526, the floating-point unit may receive a first floating-point number X having a sign, a mantissa (FRAC(X)), and an exponent (EXP(X)). During step 528, the floating-point unit may receive a second floating-point number Y having a sign, a mantissa (FRAC(Y)), and an exponent (EXP(Y)).

A first check may verify whether the first floating-point number is infinity. In response to determining that the first floating-point number is infinity, the floating-point unit may return "not a number" (NaN) during step 534 if the second floating-point number is zero. In response to determining that the second floating-point number is not zero, the floating-point unit may return "minus infinity" (−∞) during step 530 if one of the first and second floating-point numbers is negative, or the floating-point unit may return "plus infinity" (+∞) during step 536 if both of the first and second floating-point numbers are either positive or negative.

In response to determining that the first floating-point number is not infinity, a next check may verify the second floating-point number is infinity. In the event that the second floating-point number is infinity, the floating-point unit may return "not a number" (NaN) during step 534 if the first floating-point number is also zero. In response to determining that the first floating-point number is not zero, the floating-point unit may return "minus infinity" (−∞) during step 530 if one of the first and second floating-point numbers is negative, or the floating-point unit may return "plus initity" (+∞) during step 536 if both of the first and secon floating-point numbers are either positive or negative.

During step 548, the new exponent (NEXP) may be determined as the sum of the exponents of the first and second floating-point numbers (i.e., NEXP=EXP(X)+EXP(Y)).

No further handling of the new exponent such as adjustments for normalization of the mantissa portion of the result is required if the product of the mantissas of the first and second floating-point numbers is smaller than two (i.e., FRAC(X) * FRAC(Y)<2). A further adjustment to the new exponent is required if the product of the mantissas of the first and second floating-point numbers is greater or equal than two (i.e., FRAC(X) * FRAC(Y)>=2). In this scenario, the mantissa portion of the multiplication X * Y may be in the interval 2<=FRAC(X) * FRAC(Y) >4 which requires shifting the mantissa portion of the result one bit position to the right. Therefore, in response to determining that normalization of the mantissa portion of the result is required, add one to the new exponent during step 554 (i.e., NEXP=NEXP+1), and return the new exponent during step 560.

The method and apparatus described herein may be incorporated into any suitable integrated circuit (IC) or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The integrated circuit device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using floating-point arithmetic is desirable. The integrated circuit device can be used to perform a variety of different functions.

Although the method operations were described in a specific order, it should be understood that other operations may be performed in between described operations, described operations may be adjusted so that they occur at slightly different times or described operations may be distributed in a system which allows the occurance of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. Circuitry for performing arithmetic operations on floating-point numbers each having an exponent and a mantissa, comprising:
an input;
a multiplier circuit coupled to the input;
a right shifter coupled to the multiplier circuit;
a subtractor circuit coupled to the multiplier circuit;
a storage circuit coupled to the multiplier circuit and the subtractor circuit, wherein the storage circuit stores a plurality of initial mantissa values; and
configurable interconnect circuitry operable to convey signals among the input, the multiplier circuit, the subtractor circuit, and the storage circuit, wherein the configurable interconnect circuitry is configurable to implement approximations for a plurality of arithmetic operations.

2. The circuitry of claim 1, wherein:
the multiplier circuit comprises a fixed-point multiplier; and
the subtractor circuit comprises a fixed-point subtractor.

3. The circuitry of claim 1, wherein the configurable interconnect circuitry is configurable to implement approximations for arithmetic operations selected from the group consisting of: inverse square root, square root, inverse, division, multiplication, addition, and subtraction operations.

4. The circuitry of claim 1, wherein the configurable interconnect circuitry comprises a multiplexer having inputs coupled to the right shifter and the multiplier circuit, and an output coupled to the subtractor circuit, wherein the multiplexer selects between the signals generated from the multiplier circuit and the signals generated from the right shifter, and wherein the configurable interconnect circuitry routes the selected signals from the multiplexer to the subtractor circuit.

5. The circuitry of claim 4, wherein the configurable interconnect circuitry comprises a register coupled between the multiplexer and the subtractor circuit.

6. The circuitry of claim 1 further comprising:
a left shifter coupled to the storage circuit.

7. The circuitry of claim 6 further comprising:
an additional left shifter coupled to the multiplier circuit and the subtractor circuit.

8. The circuitry of claim 7, wherein the configurable interconnect circuitry comprises a multiplexer having inputs coupled to the left shifter, the additional left shifter, and an additonal storage circuit storing a constant number, and an output coupled to the subtractor circuit, wherenin the mulitplexer selects among the signals received from the additional storage circuit, the signals generated from the left shifter, and the signals generated from the additional left shifter, and wherein configurable interconnect circuitry routes the selected signals from the multiplexer to the subtractor circuit.

9. The circuitry of claim 1, wherein the configurable interconnect circuitry comprises a multiplexer having inputs coupled to the input, the multiplier circuit, the subtractor circuit, and the storage circuit, and an output coupled to the multiplier circuit, wherein the multiplexer selects among the signals received from the input, the signals generated from the multiplier circuit, the signals generated from the subtractor circuit, and the signals generated from the storage circuit, and wherein the configurable interconnect circuitry routes the selected signals from the multiplexer to the multiplier circuit.

10. A method for performing a plurality of floating-point operations on an integrated circuit, comprising:
receiving, at a control circuit, a control signal specifying a floating-point operation from the plurality of floating-point operations;
at the control circuit, implementing a state machine that is associated with the floating-point operation specified by the control signal and using the state machine to direct arithmetic circuitry on the integrated circuit;
receiving at least one floating-point number having an exponent and a mantissa;
retrieving an initial approximation value for a mantissa result from a storage circuit based on the specified floating-point operation;
with the arithmetic circuitry on the integrated circuit, computing a resulting exponent of the specified floating-point operation based on the exponent of the at least one floating-point number and the mantissa of the at least one floating-point number;
with an additional arithmetic circuitry on the integrated circuit, computing an approximation for the mantissa result of the specified floating-point operation based on the initial approximation value by:
receiving the mantissa of the at least one floating-point number at multiplier circuitry in the additional arithmetic circuitry;
routing the output of the multiplier circuitry to a right shifter in the additional arithmetic circuitry; and
at the right shifter in the additional arithmetic circuitry, right shifting the output of the multiplier circuitry by one bit position.

11. The method of claim 10, wherein the arithmetic circuitry includes configurable interconnect resources, the method further comprising:
generating control signals to configure the configurable interconnect resources based on the specified floating-point opereation.

12. The method of claim 10, wherein the additional arithmetic circuitry includes configurable interconnect resources, further comprising:
generating control signals to select a configuration for the configurable interconnect resources based on specified floating-point operation.

13. A method for perfroming a floating-point operation with a floating-point number on an integrated circuit, comprising:
receiving a mantissa of the floating-point number;
retrieving an initial approximation value from a storage circuit;
with arithmetic circuitry on the integrated circuit, computing an approximation of a mantissa result of the floating point operation based on the initial approximation value by receiving the initial approximation value at a multiplier circuit and at a left shifter circuit;
at the multiplier circuit, generating a first product by multiplying the initial approximation value with itself;
at the left shifter circuit, left shifting the initial approximation value by one bit position; and
with the arithmetic circuitry, computing an exponent result of the floating point operation based on the floating-point number.

14. The method of claim 13, wherein the floating-point operation comprises an inverse of the mantissa of the floating-point number, and wherein computing the approximation of the mantissa result of the floating point operation based on the initial approximation value comprises computing the approximation of the inverse of the mantissa, wherein computing the approximation of the inverse of the mantissa further comprises:

with the left shifter, generating a left shifted approximation value of the initial approximation value by shifting the initial approximation value one bit to the left.

15. The method of claim 14, wherein computing the approximation further comprises:

receiving the first product and the mantissa at the multiplier; and with the multiplier, generating a second product by multiplying the first product and the mantissa.

16. The method of claim 15, wherein computing the approximation further comprises:

receiving the second product and the left shifted approximation value at a subtractor;

with the subtractor, generating a difference of the left shifted approximation value and the second product; and providing the difference at an output of the arithmetic circuitry.

17. The method of claim 16, wherein computing the approximation further comprises:

computing a second approximation of the inverse of the mantissa by using the difference as the initial approximation value.

* * * * *